W. B. BROADWELL.
Cultivator.
No. 35,434. Patented June 3, 1862.
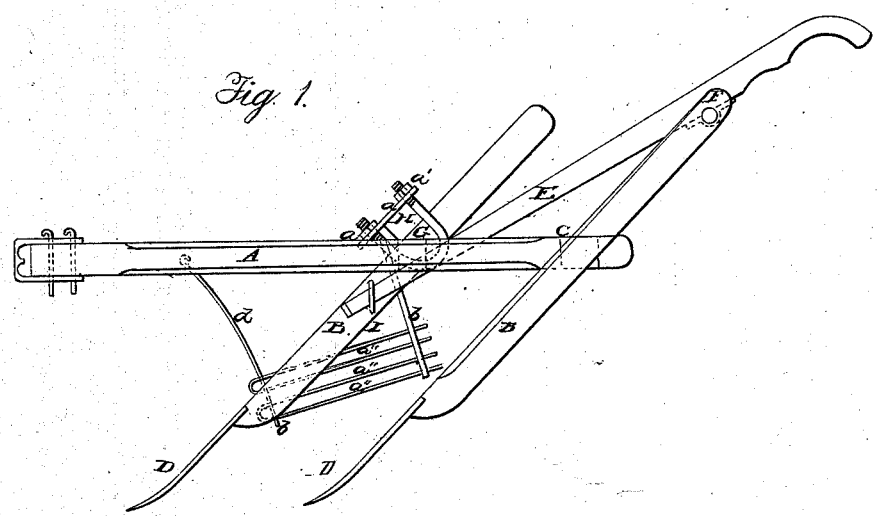
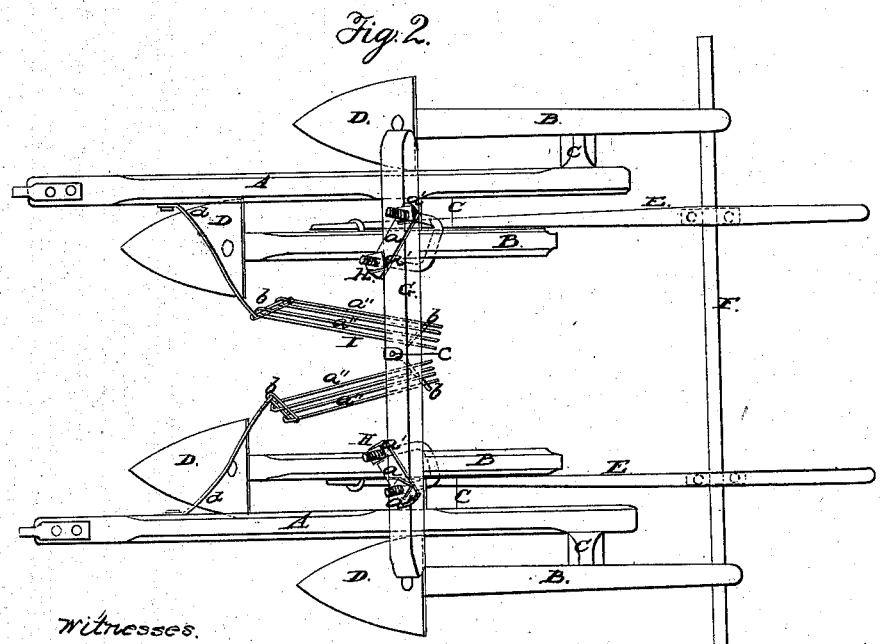

UNITED STATES PATENT OFFICE.

W. B. BROADWELL, OF SPRINGFIELD, ILLINOIS.

IMPROVEMENT IN CORN-PLOWS.

Specification forming part of Letters Patent No. 35,434, dated June 3, 1862.

*To all whom it may concern:*

Be it known that I, WILLIAM B. BROADWELL, of Springfield, in the county of Sangamon and State of Illinois, have invented a new and Improved Corn-Plow; and I do hereby declare that the following is a full, clear, and exact description of the same, reference being had to the accompanying drawings, making a part of this specification, in which—

Figure 1 is a side view of my invention. Fig. 2 is a plan or top view of the same.

Similar letters of reference indicate corresponding parts in the two figures.

To enable those skilled in the art to fully understand and construct my invention, I will proceed to describe it.

A A represent two horizontal beams, to the back parts of which two inclined bars, B B, are attached by a short horizontal cross-piece, C. The bars B B are parallel with each other, and they form plow-standards, an ordinary shovel, share, or plow, D, being attached to the lower end of each standard. One standard of each beam is a little in advance of the other, as shown clearly in Fig. 2; and to the inner standard of each beam there is attached a handle, E, through which and the upper parts of the outermost standards, B B, a bar, F, passes, as shown in Fig. 2.

G is a bar, which is secured to the innermost standards, B, by means of metal clamps H, which are formed of a U-shaped rod, having screw-threads cut on their ends, on which a cross-bar, *a*, is fitted, and nuts *a' a'*, as shown clearly in both figures. This bar G connects the two parts of the plow together, as clearly shown in Fig. 2, and one part only of the plow may be used, when desired, by simply detaching bar G. This bar G may be adjusted at any proper height on the innermost standards, B, so that it may clear the plants as the implement is drawn along.

The cross-pieces C C are of such a length as to admit of the plows or shares D being a proper distance apart.

Between the two parts of the implement there is attached a fender or guard, I, which is formed of two parts, composed each of a series of parallel rods, *a''*, the ends of which are fitted in bars *b*, inclined so as to give the two parts a flaring position, their lower edges being farther apart than their upper edges. The back bars *b* are secured centrally to the bar G by a bolt, *c*, and the front bars *b* are secured to rods *d d*, by which they are connected to the beams A A. The front bars *b* are farther apart than the back ones, and have a lower position, so as to give the fender or guard a requisite degree of inclination, as shown in Fig. 1. This fender or guard prevents clods of earth being thrown on the plants by the action of the plows or shares, the fender or guard being over the tops of the plants and extending down at each side of them. The plows or shares of the innermost standards, B B, work near the row of plants, one at each side of them, and they may be adjusted nearer together or farther apart, as may be required, by means of bar G.

The fender or guard I may be detached from the machine at any time when not required—as during the second plowing of corn, for instance.

Thus it will be seen that one or both parts of the plow may be used as desired, and the implement consequently adapted for one or two horses, while the expense of construction will not exceed that of ordinary cultivators.

I do not claim separately any of the parts described; but

I do claim as new and desire to secure by Letters Patent—

In combination with the bar G and clamps H H, the fender or guard I, applied to the beams A A and bar G, as and for the purpose specified.

WM. B. BROADWELL.

Witnesses:
 L. B. ADAMS,
 H. C. LATHAM.